(12) United States Patent
Teng

(10) Patent No.: US 8,162,523 B1
(45) Date of Patent: Apr. 24, 2012

(54) VEHICLE LIGHT WITH LED RUNNING LIGHT FRAME STRUCTURE

(75) Inventor: Wei-Cheng Teng, Shulin (TW)

(73) Assignee: Won Lung Industrial Co., Ltd., Taipei County (TW)

( * ) Notice: Subject to any disclaimer, the term of this patent is extended or adjusted under 35 U.S.C. 154(b) by 0 days.

(21) Appl. No.: 12/975,370

(22) Filed: Dec. 22, 2010

(51) Int. Cl.
*F21V 33/00* (2006.01)

(52) U.S. Cl. .......................... 362/545; 362/540; 362/800

(58) Field of Classification Search ............. 362/249.02, 362/543, 544, 545, 540, 541, 507
See application file for complete search history.

(56) References Cited

U.S. PATENT DOCUMENTS

| | | | |
|---|---|---|---|
| 3,759,084 A * | 9/1973 | Plewka | 362/311.03 |
| 6,286,984 B1 * | 9/2001 | Berg | 362/505 |
| 6,504,477 B1 * | 1/2003 | Lin | 340/472 |
| 7,011,438 B2 * | 3/2006 | Schuster et al. | 362/507 |
| 2004/0120019 A1 * | 6/2004 | Chou | 359/1 |
| 2005/0146890 A1 * | 7/2005 | Wu | 362/545 |
| 2006/0291234 A1 * | 12/2006 | Chiang | 362/545 |

* cited by examiner

*Primary Examiner* — Laura Tso
(74) *Attorney, Agent, or Firm* — Leong C. Lei

(57) ABSTRACT

A vehicle light with LED running light frame structure comprises a light cover frame and at least a soft LED light bar; at least a groove having pluralities of through holes at its bottom is provided at an appropriate position at the interior of the light cover frame; by way of provision of the soft LED light bar of a number as that of the grooves at the light cover frame, the luminous chips of the soft LED light bar can aim at the through holes at the groove; the opening of the groove is provided with a two-side adhesive tape for fastening to the vehicle light base after the electric cord extended from the soft LED light bar is connected to the vehicle powder, thereby accomplishing an electric running light.

2 Claims, 5 Drawing Sheets

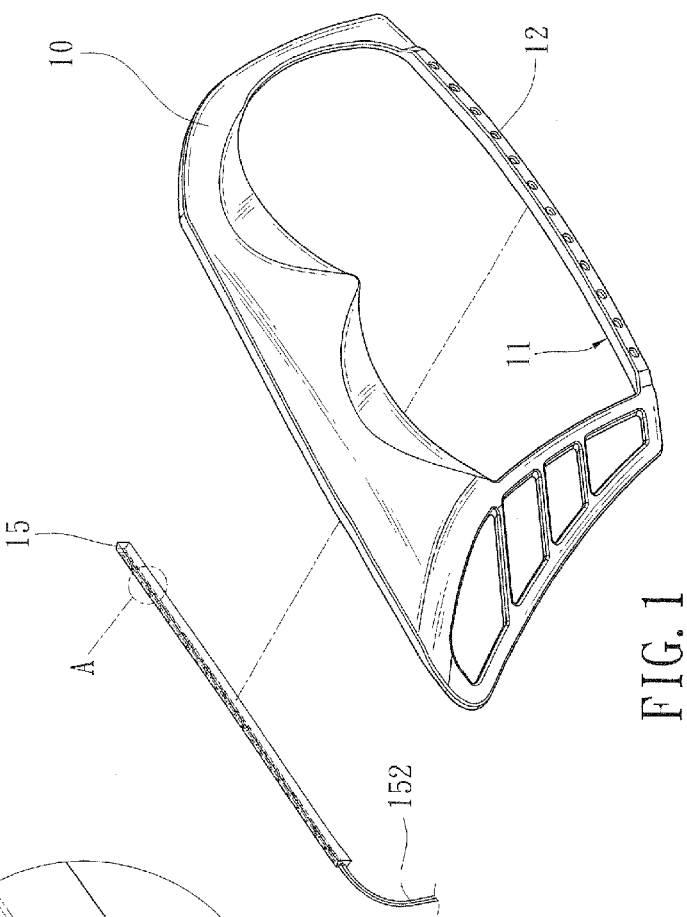
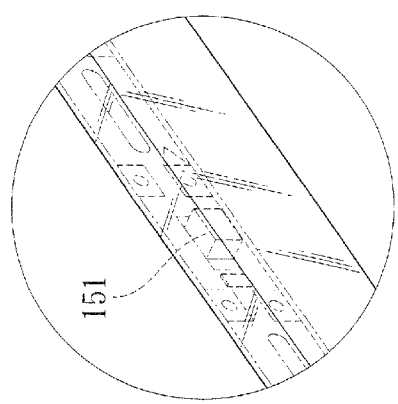
FIG. 1
FIG. 1a

VEHICLE LIGHT WITH LED RUNNING LIGHT FRAME STRUCTURE

BACKGROUND OF THE INVENTION a) Field of the Invention

The present invention relates to a vehicle light with LED running light frame structure, which may reduce manufacture cost, enhance market competitiveness, and is specially applicable to traffic instruments such as cars, motorcycles and electric vehicle for combining to vehicle lights, such that the regular vehicle lights may be further provided with frames to accomplish a running light effect to enhance driving safety.

b) Background of the Invention

Cars are nowadays primary traffic and transportation instruments by land, and have been extensively used and become indispensable in industrial development all over the world. As safety is the core issue for vehicle management in all countries, more and more countries are promoting "vehicle format safety detection practice" to control the safety specification before mass production of vehicle.

In some specific roadways or even some countries, it is stipulated that vehicle lights must be turned on even at daytime. However, some drivers might not get used to turn on vehicle lights at daytime or not notice the traffic indications for such a stipulation, and therefore run against the traffic rule and be imposed a fine, or even affect the traffic safety. According to the European Community Rule ECER78, all kinds of new vehicle should install daytime running lights (DRL). In consideration of driving safety and the need of power economization, it has become a trend to develop daytime running lights.

In view of the above, the inventor has researched to bring up a vehicle LED running light frame structure which not only can enhance the aesthetic feeling, but also can save power for the public consumers.

SUMMARY OF THE INVENTION

The primary object of the invention is to provide a vehicle light with LED running light frame structure, which has the advantages to allow the consumers to easily DIY install it by way of adhering the invention to the vehicle light to obtain a running light effect.

Another object of the invention is to provide a vehicle light with LED running light structure, which can be directly and simply provided onto the light housing at the time of manufacture of vehicle light to accomplish a front light or rear light with a running light effect, and integrally accomplish vehicle light with a running light effect, as well as reduce the cost of manufacture.

To accomplish the above objects, the vehicle light with LED running light structure according to the present invention may have the light cover frame installed onto the bulb-contained light base, such that the light base originally without a running light turns out to serve as a running light. The interior rim of the frame is provided with at least a groove. By way of providing in the groove(s) with the soft LED light bar(s) of a corresponding number, connecting the electric cord extended from the soft LED light bar to the vehicle power, and covering and adhering the frame onto the light base to make the soft LED light bar clamped between the light base and the frame, the light cover frame can be installed to the vehicle light base to accomplish a running light effect after activated by the vehicle power to simultaneously turn on the LED light bars.

The above-mentioned vehicle light with LED running light frame structure has at least one groove provided at the rim of the frame or an appropriate position corresponding to the light base.

To completely appreciate these and other objects of the present invention as well as the invention itself, all of which will become apparent to those skilled in the art, the following detailed description of the invention and the claims should be read in conjunction with the accompanying drawings.

BRIEF DESCRIPTION OF THE DRAWINGS

FIG. 1 is an exploded view of the first embodiment of the present invention.

FIG. 1a is a partially enlarged view of the first embodiment.

DETAILED DESCRIPTION OF THE PREFERRED EMBODIMENTS

Figure 2A:
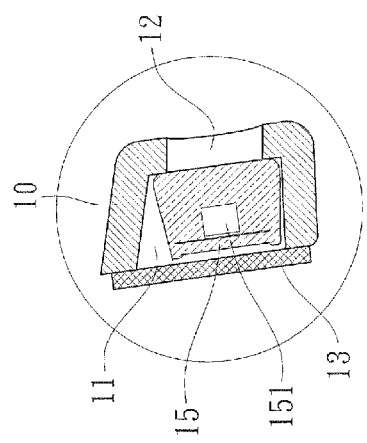
FIG. 2a is a partially enlarged view of FIG. 2.
Figure 2:
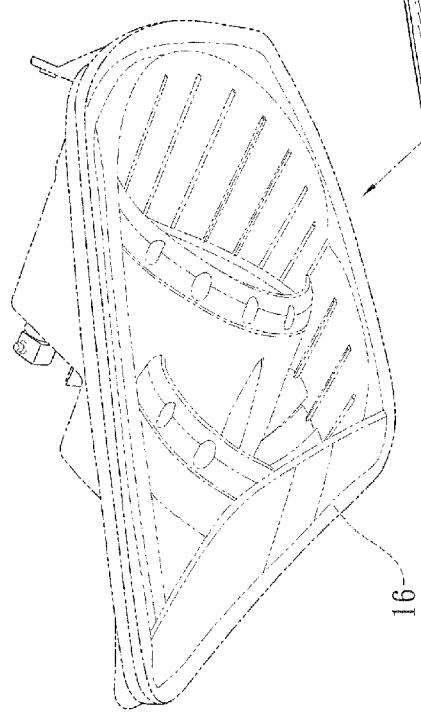
FIG. 2 is a perspective view showing combination of the first embodiment with a vehicle front light base.

Referring to FIGS. 1 and 2, the vehicle light with LED running light frame structure according to the present invention comprises a light cover frame 10 and at least a soft LED light bar 15. The light cover frame 10 can be directly adhered to the front surface of the vehicle light base 16 (as shown in FIG. 2) such that the light cover frame 10 can completely match with the periphery of the vehicle front light base 16. As shown in the embodiment, the interior bottom rim of the vehicle light cover frame 10 is provided with at least one groove 11 which has pluralities of through holes 12 at its bottom. The groove 11 is provided at an appropriate position selected from the light cover frame 10, such as the central top or the top rim of the frame. Alternatively, the groove 11 can be disposed in a vertical or slanting manner, rather than a horizontal manner.

At least a soft LED light bar 15 is further provided, the number thereof is in accordance with that of the grooves 11 at the light cover frame 10. In the embodiment shown, only one groove 11 and one soft LED light bar 15 are set. The soft LED light bar 15 is composed of pluralities of luminous chips 151, and has an electric cord 152 extended from one end thereof. The soft LED light bar 15 is disposed in the groove 11 of the light cover frame 10 (as shown in FIG. 1a) such that the luminous chips 151 can aim at the through holes 12 of the groove 11. The light cover frame 10 is mounted on the vehicle front light base 16, and a two-side adhesive tape 13 (as shown in FIG. 2a) provided at the opening of the groove 11 is applied on the vehicle front light base 16 for fastening the soft LED light bar 15. After the power is turned on, assembly of the intention is completed.

Figure 3:
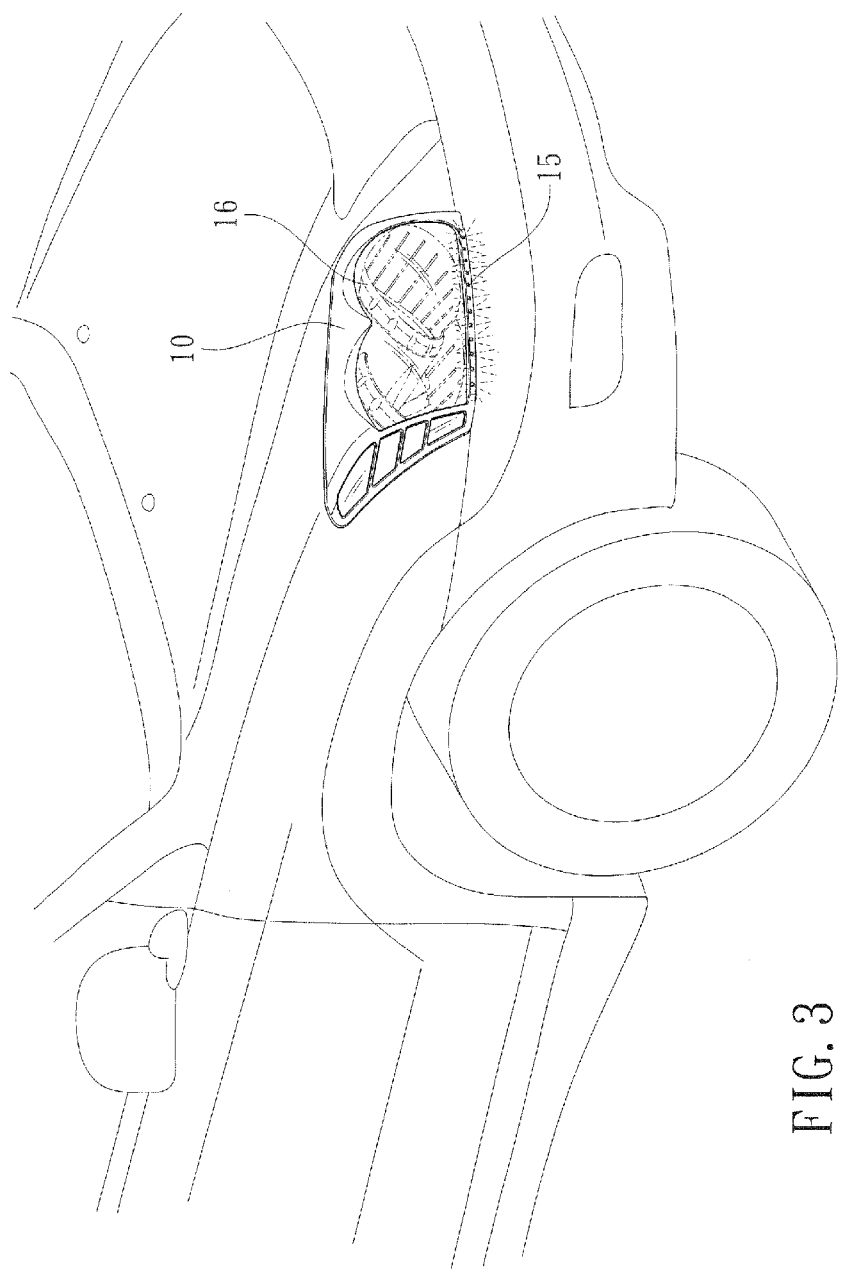
FIG. 3 shows a use status of the first embodiment after combination with a vehicle front light.

Referring to FIG. 3, after the above-mentioned components are assembled, i.e. by way of adhering the luminous soft LED light bar 15 to the light cover frame 10, the front light base 16 originally without a running light has now become a luminous front light to enhance driving safety.

The light cover frame 10 is provided with soft LED light bars 15 which can allow the light to spread out through the pluralities of through holes 12. It is convenient to directly and simply provide the light cover frame 10 onto the housing of the front light base 16 at the time of manufacture, thereby accomplishing a vehicle front light with a running light effect, as well as reducing the cost of manufacture.

In direct manufacture of the front light base 16 combining the light cover frame 10, the above assembled light cover frame 10, soft LED light bar 15 and vehicle front light base 16 can be combined to the vehicle, and by way of connecting the electric cord 152 extended from the soft LED light bar 15 to the vehicle light controller, a driver can, when driving a vehicle at daytime, turn on the luminous chips 151 of the soft LED light bars 15 via the controller, to secure driving safety and reduce the power during driving.

Figure 4:
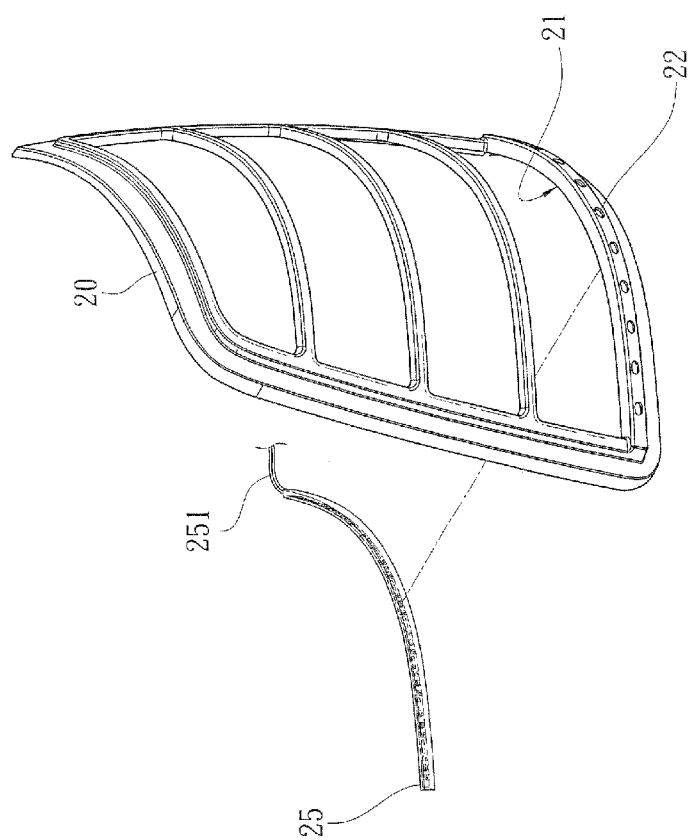
FIG. 4 is an exploded view of a second embodiment of the invention.
Figure 5:
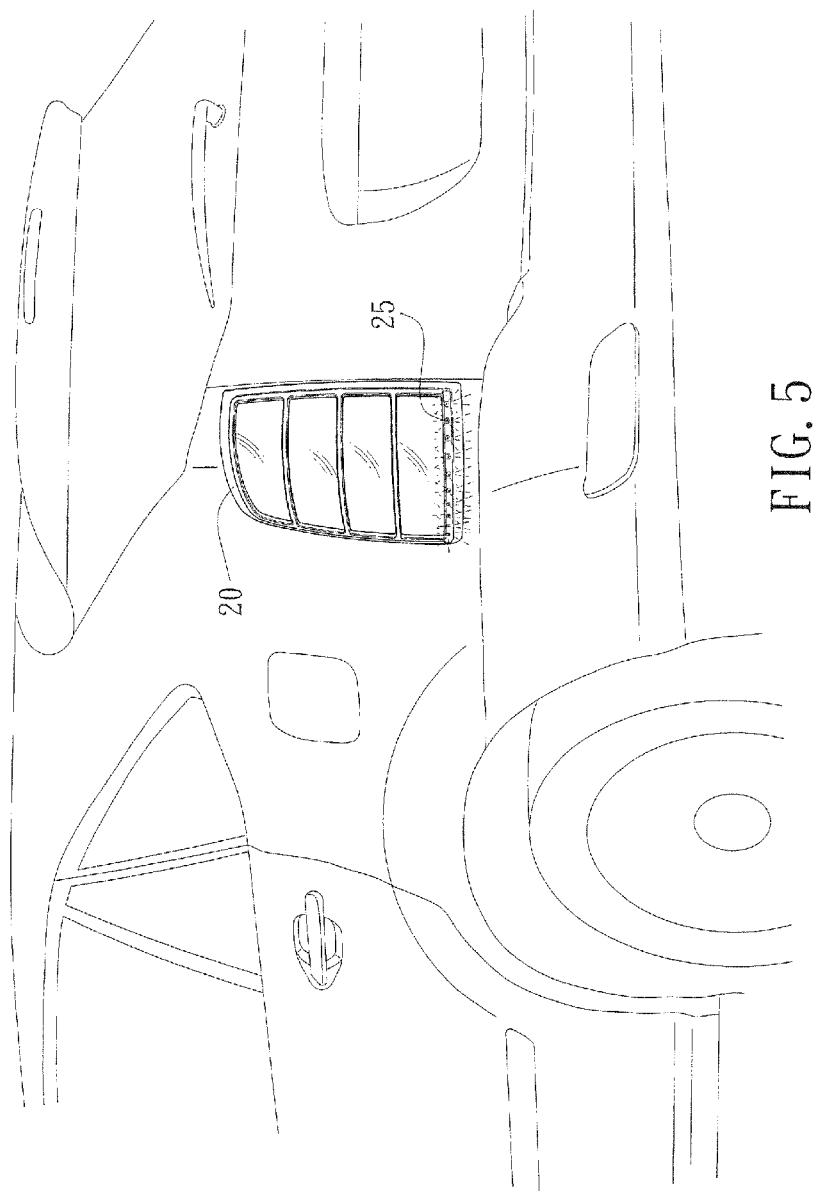
FIG. 5 shows a use status of the second embodiment after combination with a vehicle rear light.

As shown in FIGS. 4 and 5, a second embodiment of the invention refers to a light cover frame 20 of a vehicle rear light which combines at least a soft LED light bar 25, wherein the interior bottom rim of the light cover frame 20 is provided with at least a groove 21 with pluralities of through holes 22 at its bottom.

The periphery of the light cover frame 20 is set to match the vehicle rear light base. The bottom of the groove 21 has pluralities of through holes 22. As the soft LED light bar 25 is disposed in the groove 21, the number of the soft LED light bar 25 in the embodiment is set as one, in accordance with that of the groove 21. An electric cord 251 extends from the soft LED light bar 25 such that when the soft LED light bar 25 is disposed in the groove 21 at the bottom rim of the light cover frame 20, the luminous chips of the soft LED light bar 25 aim at the through holes 22, and after the power is turned on, the light from the luminous chips would radiate through the through holes 22. As shown in FIG. 5, the above-mentioned light cover frame 20 engaged with the soft LED light bars 25 is combined with the vehicle rear light base, and the electric cord 251 extended from the soft LED light bar 25 is connected with the vehicle light controller, thereby the driver can operate the controller to dominate the soft LED light bar 25 when driving at daytime to enhance driving safety, as well as increase the aesthetic feeling of the vehicle.

Likewise, in manufacture of the light cover frame 20 directly combined with the rear light base, the above assembled light cover frame 20, soft LED light bar 25 and vehicle rear light base can be combined to the vehicle, and by way of connecting the electric cord 251 extended from the soft LED light bar 25 to the vehicle light controller, a driver can, when driving a vehicle at daytime, turn on the luminous chips of the soft LED light bars 25 via the controller to secure driving safety and reduce the power during driving.

Concluded above, the invention can accomplish the desired objects for providing a vehicle light with LED running light frame structure, which can be conveniently adhered onto the vehicle light to achieve a running light effect. Alternatively, the LED running light frame structure can be directly provided on the light housing at the time of manufacture the vehicle light, such that the vehicle front or rear light may serve as a running light, and that the manufacture cost can be reduced.

While certain novel features of this invention have been shown and described and are pointed out in the annexed Claims, it is not intended to be limited to the details above, since it will be understood that various omissions, modifications, substitutions and changes in the forms and details of the device illustrated and in its operation can be made by those skilled in the art without departing in any way from the spirit of the present invention.

Although specific embodiments have been illustrated and described, it will be obvious to those skilled in the art that various modifications may be made without departing from what is intended to be limited solely by the appended claims.

I claim:

1. A vehicle light with LED running light frame structure, comprising a light cover frame and at least a soft LED light bar, characterized by:

the light cover frame is provided at the interior bottom rim with at least a groove which has pluralities of through holes at its bottom;

the number of the soft LED light bar is set in accordance with that of the groove at the light cover frame, whereas the soft LED light bar is composed of pluralities of luminous chips, and is connected at its end with an extending electric cord;

thereby the soft LED light bar can be disposed into the groove of the light cover frame such that the luminous chips can aim at the through holes at the groove; the opening of the groove is provided with a two-side adhesive tape for fastening to the vehicle light base.

2. The vehicle light with LED running light frame structure according to claim 1, wherein the LED running light frame may be combined with a vehicle light base to form a front light or a rear light with a running light effect.

* * * * *